(12) United States Patent
Macek

(10) Patent No.: US 6,578,271 B1
(45) Date of Patent: Jun. 17, 2003

(54) GUTTING KNIFE

(76) Inventor: Leopold Macek, Hauptstrasse 49, D-97717 Sulzthal (DE)

( * ) Notice: Subject to any disclaimer, the term of this patent is extended or adjusted under 35 U.S.C. 154(b) by 23 days.

(21) Appl. No.: 09/723,199

(22) Filed: Nov. 27, 2000

(30) Foreign Application Priority Data

Nov. 27, 1999 (DE) ..................................... 299 20 823 U

(51) Int. Cl.⁷ ............................. B26B 3/00; B26B 9/02; B26B 1/00; B25G 1/00; A22B 5/16
(52) U.S. Cl. ..................... 30/279.2; 30/294; 30/337; 30/340; 30/355; 452/132
(58) Field of Search ..................... 30/355, 294, 293, 30/289, 279.2, 122, 340, 337, 517; 452/132, 133; D22/118

(56) References Cited

U.S. PATENT DOCUMENTS

| 421,197 | A | * | 2/1890 | Schofield | 30/289 |
| 1,671,043 | A | * | 5/1928 | Murphy | 30/113.3 |
| D152,727 | S | * | 2/1949 | Peterson | D22/3 |
| 3,605,268 | A | * | 9/1971 | Cassell | 30/144 |
| 4,669,186 | A | * | 6/1987 | Liu | 30/125 |
| D296,577 | S | * | 7/1988 | Schandua | D22/118 |
| 6,276,014 | B1 | * | 8/2001 | Lee | 7/158 |

* cited by examiner

Primary Examiner—Allan N. Shoap
Assistant Examiner—Isaac Hamilton
(74) Attorney, Agent, or Firm—Ostrolenk, Faber, Gerb & Soffen, LLP

(57) ABSTRACT

A gutting knife including a blade with two forward extensions that define a slot between them and a peripheral cutting edge defined around the sides and bottom of the slot. A first extension has a spike tip and a cutting edge along its outside. A second extension has a blunt tip or bulge which does not cut. A meander pathway along the second extension into the slot. Saw teeth into the slot on the first extension. A recess on the outside of the second extension is inclined rearwardly and includes a cutting edge. A handle at the rear of the knife blade.

11 Claims, 3 Drawing Sheets

GUTTING KNIFE

BACKGROUND OF THE INVENTION

The present invention relates to gutting knives that are used to "break open" a wild animal which has been shot or a slaughtered animal, i.e. to open up the animal so that the internal organs can be removed.

The known gutting knives comprise a tang (handle) and a blade which is sharp on one or both sides. This gutting knife is used to cut open the hide (skin) at the belly of the animal and to slit open the belly skin as far as the thorax. These knives can also be used to divide/cut up the meat which has been removed. To allow the internal organs (pharynx, lungs, stomach, liver/gall bladder, intestines, bladder, etc.) to be removed undamaged, further tools, such as bone cutters, bone saws and the like are required as well as the gutting knife in order to break up/sever bones, for example the breastbone.

It is essential for the quality and usability of meat as human food that the internal organs be removed undamaged, since if any of the contents of the stomach, intestines, bladder or gall bladder escape, the body cavity of the animal must be washed with water immediately. This is a measure which is scarcely possible, if at all, when hunting or outside an abattoir.

SUMMARY OF THE INVENTION

The invention is based on the object of providing a gutting knife which has the tools required for the purpose of opening up a shot/slaughtered animal and for removing the internal organs.

According to the invention, the object is achieved by providing a gutting knife with two forwardly extending extensions which define a slot between them. The slot is defined by a peripheral cutting edge on the inward facing edges of both extensions and at the bottom of the slot. The first extension ends in a spike tip and has a cutting edge along the outward facing edge. The second extension has a blunt tip, e.g., a bulge, which does not cut. The entrance to the slot has a meander path on the inside of the second extension and has saw teeth on the inside of the first extension. The outward facing edge of the second extension has a recess with a cutting edge, and may also have saw teeth. A handle for the blade may have a holder for blades or tools.

BRIEF DESCRIPTION OF THE DRAWINGS

Exemplary embodiments of the subject matter of the invention are diagrammatically illustrated in the drawings, in which.

DETAILED DESCRIPTION OF PREFERRED EMBODIMENTS

Figure 1:
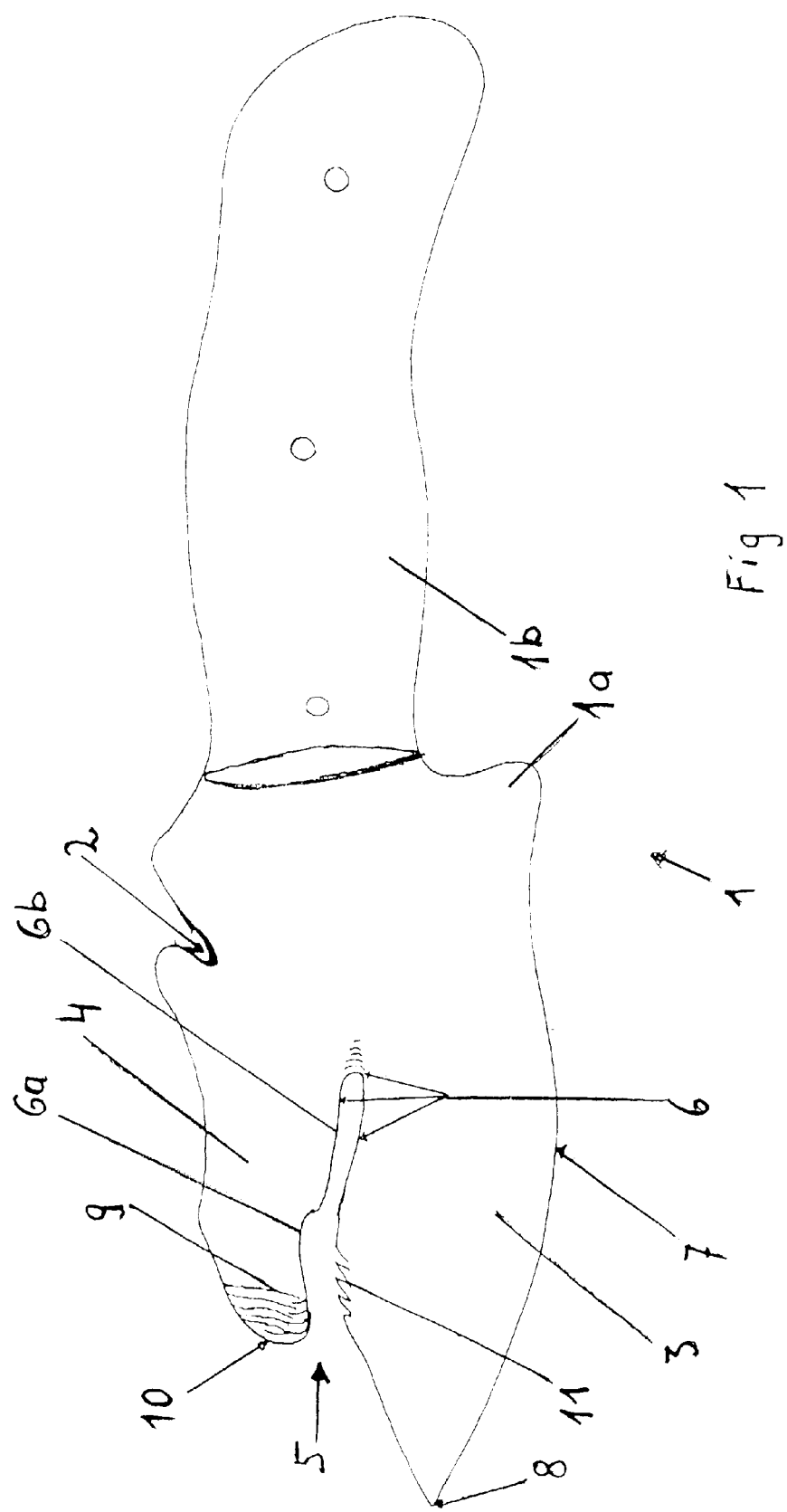
FIG. 1 shows a side view of the gutting knife according to the invention.
Figure 2:
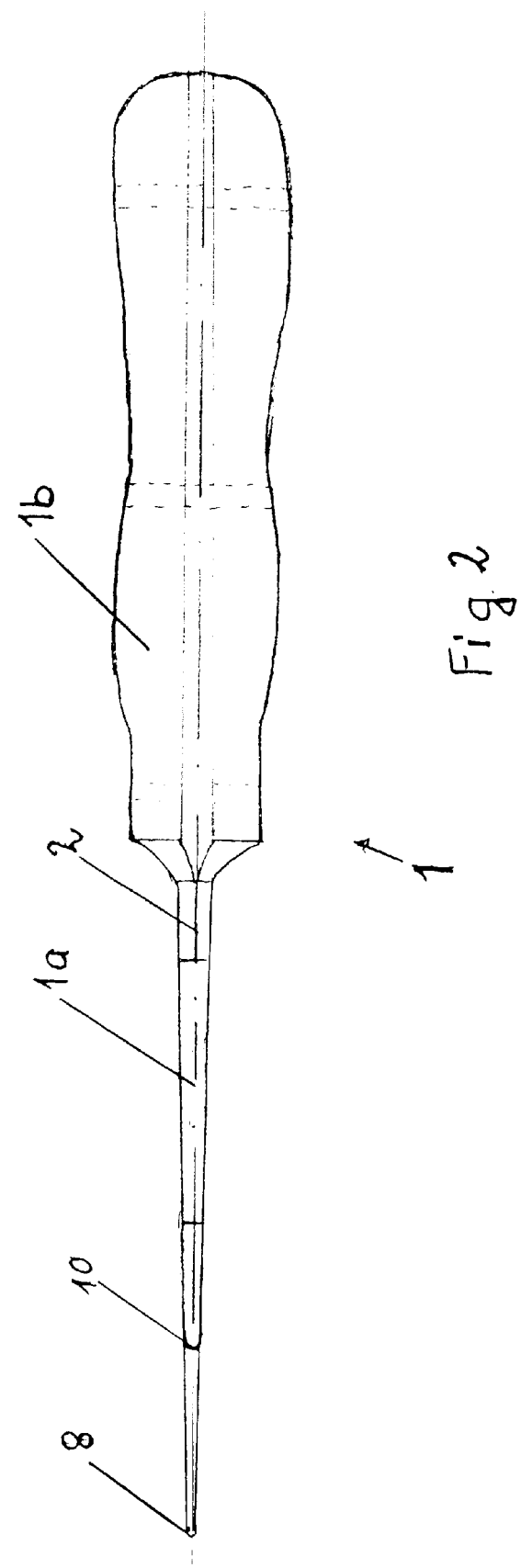
FIG. 2 shows a plan view of the gutting knife shown in FIG. 1.

A gutting knife shown in FIG. 1 comprises a blade 1a which is secured in a tang/handle 1b. The blade 1a has two extensions 3 and 4. The two extensions 3 and 4 surround and define a slot 5 which is open at the front of the knife: A recess 2, which is provided with a peripheral cutting edge, is defined on the outward facing edge at the top side of the extension 4. This recess 2 is preferably oriented at an angle of 45° with respect to the longitudinal axis of the gutting knife 1, with the open side inclined rearward toward the tang/handle 1b.

The slot 5 is provided with a peripheral cutting edge 6 at its inward facing edges at the opposing sides of the extensions and at its closed end.

On its outward facing edge at its lower side, the first extension 3 has a cutting edge 7 which ends in a spike-like tip 8. The inward facing side of the extension 3 facing toward the slot 5 is provided with toothing 11.

Figure 3:
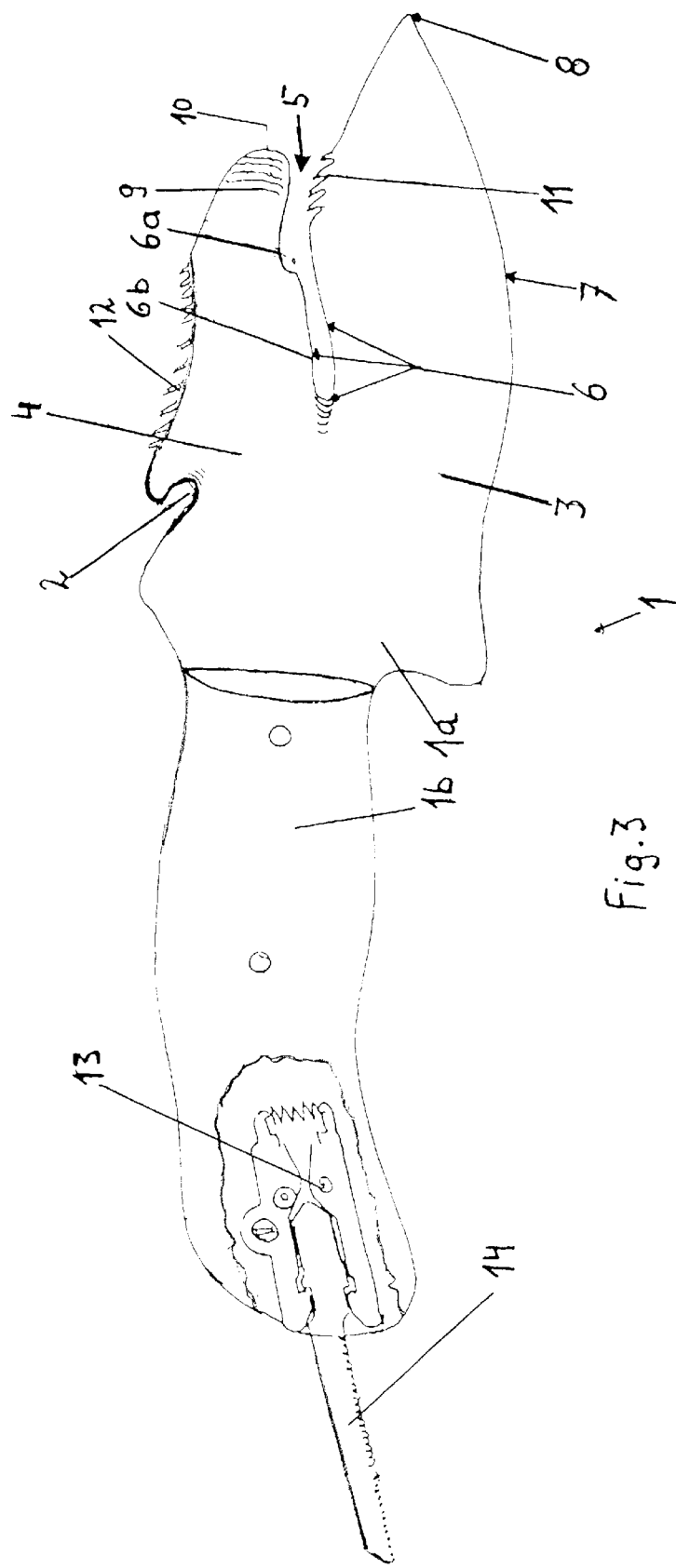
FIG. 3 shows a side view of another embodiment of the gutting knife shown in FIG. 1, with the tang (handle) partially in section.

The second extension 4 has a blunt tip 10 with a thickened section, known as a bulge 9. The inward facing peripheral cutting edge 6 on the extension 4 has a meandering form 6a, 6b on the extension 4 in the region between the blunt tip 10 and the outward end of the slot 5. Between the tip 10 and the recess 2, the outward facing edge of the extension 4 may be provided with saw toothing 12 (FIG. 3).

To accommodate further, expediently exchangeable, tools, a holding device 13, into which various saw blades 14 can be fitted and held, is arranged inside the tang/handle 1b.

The individual knife blade designs function as follows:

The spike-like tip 8 is used to carefully puncture the abdominal wall of the animal which has been shot. Then, the blunt tip 10, which is provided with a bulge 9, is introduced into this opening in the abdominal wall. The gutting knife 1 is guided toward the rump of the animal, in such a way that the skin of the animal is cut through inside the slot 5 by the peripheral cutting edge 6, with the blunt tip 10 bearing against the inside of the animal's skin inside the animal's body. When the gutting knife 1 is pressed toward the rump of the animal, the bulge 9 pushes the organs which are in the immediate vicinity of the blade 1a to the side, and away from the blade 1a in such a manner that there is no possibility of the stomach, intestines, bladder, etc. being damaged.

The gap 5 between the extensions 3 and 4 eliminates the possibility of "slipping", i.e. of the knife unintentionally sliding into the body of the animal, so that this "forced" guidance for the blade 1a allows even a relatively inexperienced user of the gutting knife 1 to make a perfect opening in the animal's body.

As a result of the meandering design 6a, 6b of the cutting edge 6 on the second extension 4, between the blunt tip 10 and the end of the gap, the region 6a will have the effect of cutting into the animal's skin, and the region 6b will sever the skin, during the forward movement of the gutting knife 1.

When the abdominal wall of the animal has been cut open as far as the pubic bone (symphysis pubica pelvina), the pubic bone has to be severed, in order for the intestine and possibly the bladder to be removed without being damaged. During severing of the pubic bone, the toothing is supported on the bone and the gutting knife 1 is passed through the pubic bone as a result of the upward and downward movement around the toothing 11.

After the skin/hide has been cut through along the breastbone, the bones of the thorax are severed using the same movements of the gutting knife 1. Then, the internal organs, such as trachea and esophagus, heart, lungs, etc., can be removed undamaged.

The cutting recess 2 allows tendons and muscle attachment fibers to be severed.

The saw toothing 12 on the outward facing edge on the top side of the second extension 4 in FIG. 3 is inclined with respect to the tang/handle 1b in such a way that it does not cause any damage to internal organs of the animal as it is "passing through" the abdominal cavity.

The saw toothing 12 can be used to cut through bones of the animal, the sawing action being produced when the gutting knife 1 is being "pulled" and not "pushed".

As shown in FIG. 3, a securing device 13 for holding further tools, such as for example saw blades 14, may be accommodated in the tang/handle 1b.

This multifunctional gutting knife 1 enables the hunter (ranger) to gut a wild animal which has been shot without damaging the internal organs and, if desired, to cut up the animal in the wild.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A gutting knife comprising
    a knife blade comprised of a first and a second forwardly extending extensions which are shaped and positioned to define a slot which separates the extensions, and the slot having a closed end, the extensions having opposed inwardly facing edges, the slot having and being defined by a peripheral sharpened cutting edge which extends along the inwardly facing edges of the extensions, and the peripheral sharpened cutting edge also extends to and about the closed in of the slot;
    the first extension having an outwardly facing sharpened cutting edge ending at a most forward end of said knife;
    the second extension having a forward end with a tip which is blunted to be less likely to cut as the blade is moved forward;
    the first extension having a toothing portion across from the blunted tip of the second extension; and
    the first extension having a portion diverging away from said second extension and said slot, said portion comprising a sharpened edge from said toothing portion to said most forward end of said knife.

2. The gutting knife of claim 1, wherein the blunt tip has the form of a bulge.

3. The gutting knife of claim 1, wherein the first extension has a forward end with a tip that is spike shaped.

4. The gutting knife of claim 3, wherein
    the forward end of the first extension has an inward side that is opposed to the second extension and extends beyond a length of the second extension; and
    the toothing portion of the first extension is directed rearwardly, toward the slot.

5. The gutting knife of claim 1, wherein the peripheral cutting edge at the second extension in the slot has a meandering form between the blunt tip of the second extension and the slot.

6. The gutting knife of claim 1, further comprising one of the extensions having an outward facing side and a recess defined in the outward facing side, the recess having a respective peripheral cutting edge at the recess.

7. The gutting knife of claim 6, wherein the recess is oriented at an angle of approximately 45° to the rear of the blade and with respect to the longitudinal axis of the blade.

8. The gutting knife of claim 6, wherein the recess is in the second extension, the outward facing side of the second extension has a portion between the blunt tip and the recess, and the portion has saw toothing defined thereon.

9. The gutting knife of claim 1, wherein the second extension has an outward facing side out of the slot with saw toothing defined thereon.

10. The gutting knife of claim 1, wherein the blade has a rearward end, the knife further comprising a handle in which the rearward end of the blade is received.

11. The gutting knife of claim 10, further comprising a holding device in the handle for receiving and holding tools at the handle.

* * * * *